US008027437B2

(12) United States Patent
Patel et al.

(10) Patent No.: US 8,027,437 B2
(45) Date of Patent: Sep. 27, 2011

(54) SYSTEM AND METHOD FOR IMPROVING MESSAGE DELIVERY IN VOICE SYSTEMS UTILIZING MICROPHONE AND TARGET SIGNAL-TO-NOISE RATIO

(75) Inventors: Paritosh D. Patel, Parkland, FL (US); Oscar J. Blass, Boynton Beach, FL (US); Roberto Vila, Hollywood, FL (US); Jie Z. Zeng, Palmetto Bay, FL (US); Anatol Blass, Atlanta, GA (US)

(73) Assignee: Nuance Communications, Inc., Burlington, MA (US)

( * ) Notice: Subject to any disclaimer, the term of this patent is extended or adjusted under 35 U.S.C. 154(b) by 1280 days.

(21) Appl. No.: 11/612,329

(22) Filed: Dec. 18, 2006

(65) Prior Publication Data

US 2008/0147386 A1 Jun. 19, 2008

(51) Int. Cl.
*H04M 1/64* (2006.01)

(52) U.S. Cl. .................... 379/76; 379/22.08; 379/88.16; 381/13; 381/71.1; 381/94.1

(58) Field of Classification Search .................... 379/68, 379/67.1, 76, 88.22, 22.08, 392.01, 88.16; 381/13, 71.1, 71.4, 71.12, 73.1, 94.1, 57, 381/226

See application file for complete search history.

(56) References Cited

U.S. PATENT DOCUMENTS

| | | | | | |
|---|---|---|---|---|---|
| 4,254,303 | A | * | 3/1981 | Takizawa | 381/107 |
| 5,434,922 | A | * | 7/1995 | Miller et al. | 381/57 |
| 5,615,270 | A | * | 3/1997 | Miller et al. | 381/57 |
| 5,771,297 | A | * | 6/1998 | Richardson | 381/57 |
| 5,844,992 | A | * | 12/1998 | Boyer | 381/57 |
| 6,805,633 | B2 | | 10/2004 | Hein, Jr. et al. | |
| 6,988,068 | B2 | | 1/2006 | Fado et al. | |
| 6,993,349 | B2 | | 1/2006 | Martinez et al. | |
| 6,993,479 | B1 | | 1/2006 | Bichsel | |
| 2004/0125962 | A1 | | 7/2004 | Christoph | |
| 2005/0168333 | A1 | | 8/2005 | Cronin | |
| 2005/0251389 | A1 | | 11/2005 | Zangi | |
| 2006/0074648 | A1 | | 4/2006 | Bichsel | |
| 2006/0126865 | A1 | | 6/2006 | Blamey et al. | |

(Continued)

OTHER PUBLICATIONS

Torick et al., An Interphone System for "Hands-Free" Operation in High Ambient Noise, IEEE Transactions on Audio & Electroacoustics, vol. AU-14, No. 4, Dec. 1966, pp. 168-173.

(Continued)

*Primary Examiner* — Olisa Anwah
(74) *Attorney, Agent, or Firm* — Wolf, Greenfield & Sacks, P.C.

(57) ABSTRACT

A method for delivering a message to a recipient in an environment with ambient noise includes the steps of recording the ambient noise in the environment at a certain time interval, analyzing the recorded ambient noise to obtain an average power $P_{noise}$ or a RMS amplitude $A_{noise}$ of the ambient noise, providing a predetermined desired $SNR_{desired}$, calculating an average signal power $P_{signal}$ or a RMS amplitude $A_{signal}$ of the message to be delivered based on the $P_{noise}$ or $A_{noise}$ and the desired $SNR_{desired}$, and adjusting a volume of the message to be delivered according to the $P_{signal}$ or $A_{signal}$. Alternatively, the actual $SNR_{actual}$ will be computed and the message will be repeated if the $SNR_{actual}$ falls below the $SNR_{min}$. Systems for delivering a message to a recipient in an environment with ambient noise and computer-readable media having computer-executable instructions for carrying out the methods are also provided.

22 Claims, 8 Drawing Sheets

U.S. PATENT DOCUMENTS

| | | | | |
|---|---|---|---|---|
| 2006/0140312 | A1 | 6/2006 | Bune | |
| 2007/0263847 | A1 * | 11/2007 | Konchitsky | 379/392.01 |
| 2008/0085007 | A1 * | 4/2008 | Engelbrecht et al. | 381/57 |

OTHER PUBLICATIONS

Marro et al., Analysis of Noise Reduction & Dereverberation Techniques Based on Micro-phone Arrays with Postfiltering, IEEE Transactions on Speech & Audio Processing, vo. 6, No. 3, May 1998.

* cited by examiner

SYSTEM AND METHOD FOR IMPROVING MESSAGE DELIVERY IN VOICE SYSTEMS UTILIZING MICROPHONE AND TARGET SIGNAL-TO-NOISE RATIO

FIELD OF THE INVENTION

The present invention relates to a system and a method for delivering voice messages, and more specifically, to a system and a method for improving message delivery in voice systems utilizing a microphone and a target Signal-to-Noise Ratio (SNR).

BACKGROUND OF THE INVENTION

Audio system messages in environments such as an automobile may be affected by both system components and external factors. The system components include, for example, sounds from the auto's radio or noise carried into the auto when the windows are open. The external factors include, for example, the noise caused when a baby is crying in the back seat or a freight train is passing in front of the car. While the system can possibly adjust the system components (such as by turning off the radio or closing the windows), it may be an annoyance to the end user. In addition, the external factors cannot be controlled by the system and may affect the Speech Intelligibility (SI) of the voice system.

Currently, systems attempt to make spoken information clearer by taking actions such as temporarily muting the radio or automatically adjusting the volume of a car radio depending on the level of engine noise. Such actions, however, are typically not sufficient to control external factors. They can also change the state of the system in ways the user may not want. Moreover, conventional techniques intended to make spoken information clearer generally do not take advantage of information provided by microphones typically found in voice systems. In addition, speaker placement is not fixed for some voice systems (such as an automated house) so delivery of the message cannot be guaranteed. For users to adopt voice systems critical information should be delivered with certainty. However, an overall solution has not been developed to solve the above problems.

SUMMARY OF THE INVENTION

One aspect of the present invention is a method for delivering a message to a recipient in an environment with ambient noise. The method includes recording the ambient noise in the environment at a certain time interval, analyzing the recorded ambient noise to obtain an average power $P_{noise}$ or RMS amplitude $A_{noise}$ of the ambient noise, providing a predetermined desired $SNR_{desired}$, calculating an average signal power $P_{signal}$ or RMS amplitude $A_{signal}$ of the message to be delivered based on the $P_{noise}$ or $A_{noise}$ and the desired $SNR_{desired}$, and adjusting a volume of the message to be delivered according to the $P_{signal}$ or $A_{signal}$.

Another aspect of the invention also provides a method for delivering a message to a recipient in an environment with ambient noise. The method includes the steps of delivering a message, recording audio at or near the recipient, analyzing the recorded audio to obtain an actual $SNR_{actual}$, providing a predetermined minimum $SNR_{min}$, and repeating the message if the actual $SNR_{actual}$ falls below the $SNR_{min}$.

Yet another aspect of the invention is a system for delivering a message to a recipient in an environment with ambient noise. The system includes a recording unit for recording the ambient noise in the environment at a certain time interval, an analyzing unit for analyzing the recorded ambient noise to obtain an average power $P_{noise}$ or RMS amplitude $A_{noise}$ of the ambient noise, means for providing a predetermined desired Signal-to-Noise Ratio $SNR_{desired}$, a calculating unit for calculating an average signal power $P_{signal}$ or RMS amplitude $A_{signal}$ of the message to be delivered based on the $P_{noise}$ or $A_{noise}$ and the desired $SNR_{desired}$, and an adjusting unit for adjusting a volume of the message to be delivered according to the $P_{signal}$ or $A_{signal}$.

The present invention also provides a system for delivering a message to a recipient in an environment with ambient noise, which includes a delivering unit for delivering the message, a recording unit for recording audio at or near the recipient when the message is delivered, an analyzing unit for analyzing the recorded audio to obtain an actual $SNR_{actual}$, means for providing a predetermined minimum Signal-to-Noise Ratio $SNR_{min}$, and means for repeating the message if the actual $SNR_{actual}$ falls below the $SNR_{min}$.

A further aspect of the present invention is a computer-readable media in which is stored computer-executable instructions for carrying out a method for delivering a message to a recipient in an environment with ambient noise. The method includes the steps of recording the ambient noise in the environment at a certain time interval, analyzing the recorded ambient noise to obtain an average power $P_{noise}$ or RMS amplitude $A_{noise}$ of the ambient noise, providing a predetermined desired Signal-to-Noise Ratio $SNR_{desired}$, calculating an average signal power $P_{signal}$ or RMS amplitude $A_{signal}$ of the message to be delivered based on the $P_{noise}$ or $A_{noise}$ and the desired $SNR_{desired}$, and adjusting a volume of the message to be delivered according to the $P_{signal}$ or $A_{signal}$.

The present invention also provides a computer-readable media in which is stored computer-executable instructions for carrying out a method for delivering a message to a recipient in an environment with ambient noise. The method includes the steps of delivering a message, recording audio at or near the recipient, analyzing the recorded audio to obtain an actual Signal-to-Noise Ratio $SNR_{actual}$, providing a predetermined minimum Signal-to-Noise Ratio $SNR_{min}$, and repeating the message if the actual $SNR_{actual}$ falls below the $SNR_{min}$.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION OF THE INVENTION

The present invention continuously monitors the ambient noise in the environment of a voice system even when a Push-to-Speak button of the voice system is not pressed. This measurement typically will be measured in decibels. In one embodiment, the weighted average of ambient noise would be maintained over a window of a fixed interval. The interval can, for example, be 20 seconds. Other intervals are possible depending on the circumstances. When the system delivers information to the user, the volume can be adjusted to a level which has a satisfactory SNR. This can provide as close as possible 100% certainty that the message has the adequate SI. The system is assumed not to be processing commands until the Push-to-Speak button is pressed. This mode will be referred to as Passive Monitoring Mode (PMM). This adjustment of volume would need to occur after analyzing the average power of the signal to be delivered.

SNR is defined as the ratio of a given transmitted signal to the background noise of the transmission medium. Because many signals have a very wide dynamic range, SNRs are usually expressed in terms of the logarithmic decibel scale. In decibels, the SNR is 20 times the base-10 logarithm of the amplitude ratio, or 10 times the logarithm of the power ratio:

$$SNR(\mathrm{dB}) = 10\ \log_{10}\left(\frac{P_{signal}}{P_{noise}}\right) = 20\ \log_{10}\left(\frac{A_{signal}}{A_{noise}}\right) \qquad (1)$$

where P is average power and A is RMS amplitude. This equation can be solved for $A_{signal}$ or $P_{signal}$ which are directly related to the RMS amplitude. The known variables in the equation would be $P_{noise}$ or $A_{noise}$ and $SNR_{desired}$.

The present invention further provides a system and a method which expands upon the above system and method by computing $SNR_{actual}$. This is achieved through utilizing the microphone at the time the audio message is delivered. Since the noise level in the environment can and will suddenly change, the $SNR_{actual}$ could differ significantly from $SNR_{desired}$, which is based on the data collection in the frame of 20 previous seconds. In one embodiment of this method, the message could be repeated if $SNR_{actual}$, falls below certain critical criterion, such as $SNR_{min}$.

Figure 1:
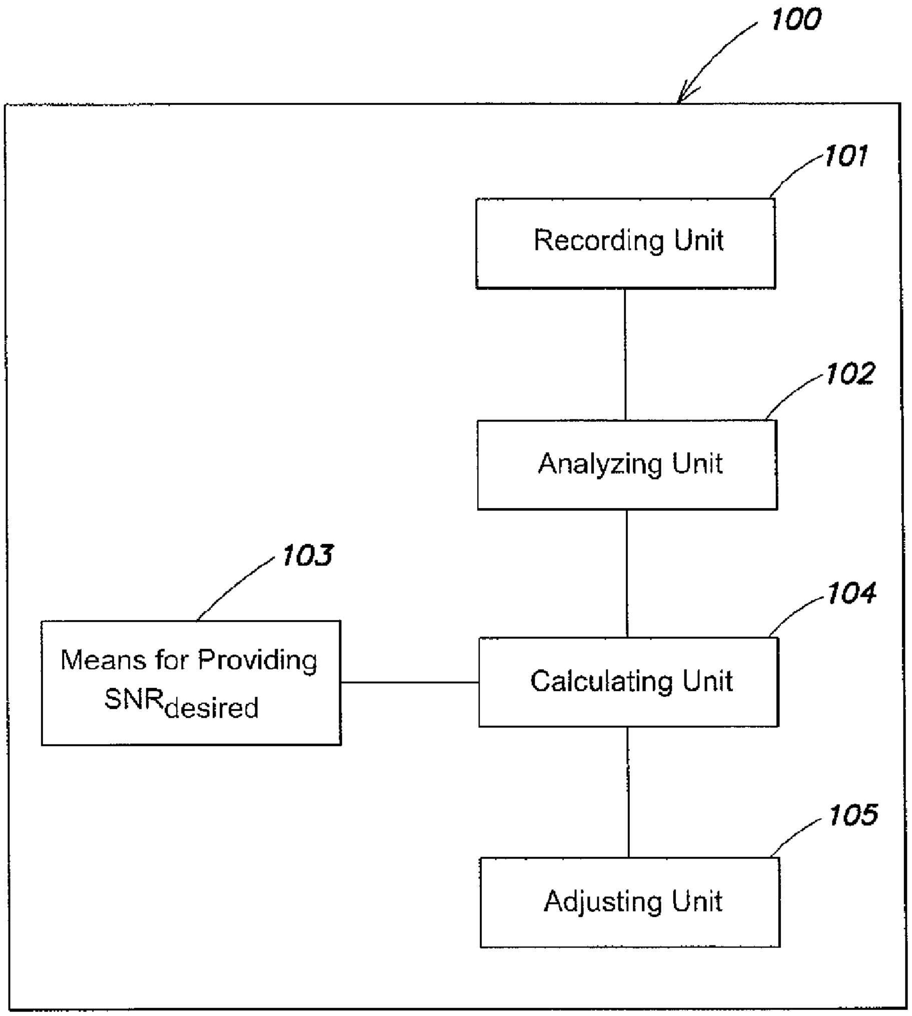
FIG. 1 is a schematic illustration of one embodiment of a system for delivering a message to a recipient in an environment with ambient noise according to the present invention.

FIG. 1 schematically illustrates a system for delivering a message to a recipient in an environment with ambient noise according to one embodiment of the present invention. As can be seen in FIG. 1, the system 100 includes a recording unit 101 for recording the ambient noise in the environment at a certain time interval; an analyzing unit 102 for analyzing the recorded ambient noise to obtain an average power $P_{noise}$ or RMS amplitude $A_{noise}$ of the ambient noise; means 103 for providing a predetermined desired Signal-to-Noise Ratio $SNR_{desired}$; a calculating unit 104 for calculating an average signal power $P_{signal}$ or RMS amplitude $A_{signal}$ of the message to be delivered based on the $P_{noise}$ or $A_{noise}$ and the desired $SNR_{desired}$; and an adjusting unit 105 for adjusting a volume of the message to be delivered according to the $P_{signal}$ or $A_{signal}$.

Figure 2:
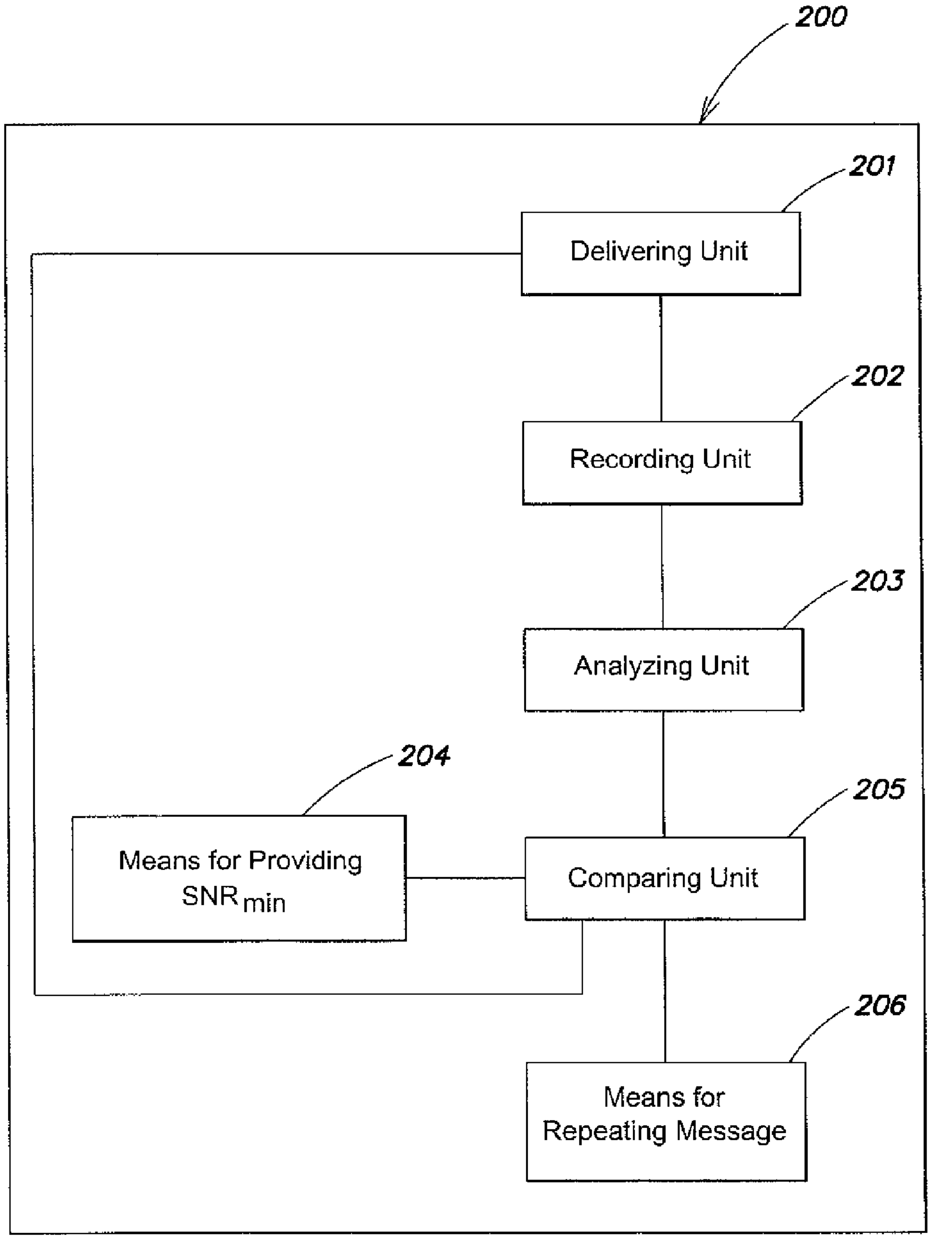
FIG. 2 is a schematic illustration of another embodiment of a system for delivering a message to a recipient in an environment with ambient noise according to the present invention.

FIG. 2 schematically illustrates a system for delivering a message to a recipient in an environment with ambient noise according to another embodiment of the present invention. As can be seen in FIG. 2, the system 200 includes a delivering unit 201 for delivering a message; a recording unit 202 for recording audio at or near the recipient when the message is delivered; an analyzing unit 203 for analyzing the recorded audio to obtain an actual $SNR_{actual}$; means 204 for providing a predetermined minimum Signal-to-Noise Ratio $SNR_{min}$; a comparing unit 205 for comparing the actual $SNR_{actual}$ with the $SNR_{min}$; and means 206 for repeating the message if the actual $SNR_{actual}$ falls below the $SNR_{min}$. The means for repeating the message can be the same device as the delivering unit or a different device at a different location.

The system for improving message delivery as described above can be implemented within the voice system (integrated with the voice system) or can be implemented external to the voice system. The latter provides more flexibility, meaning such a system can be used together with a variety of voice systems.

Figure 3:
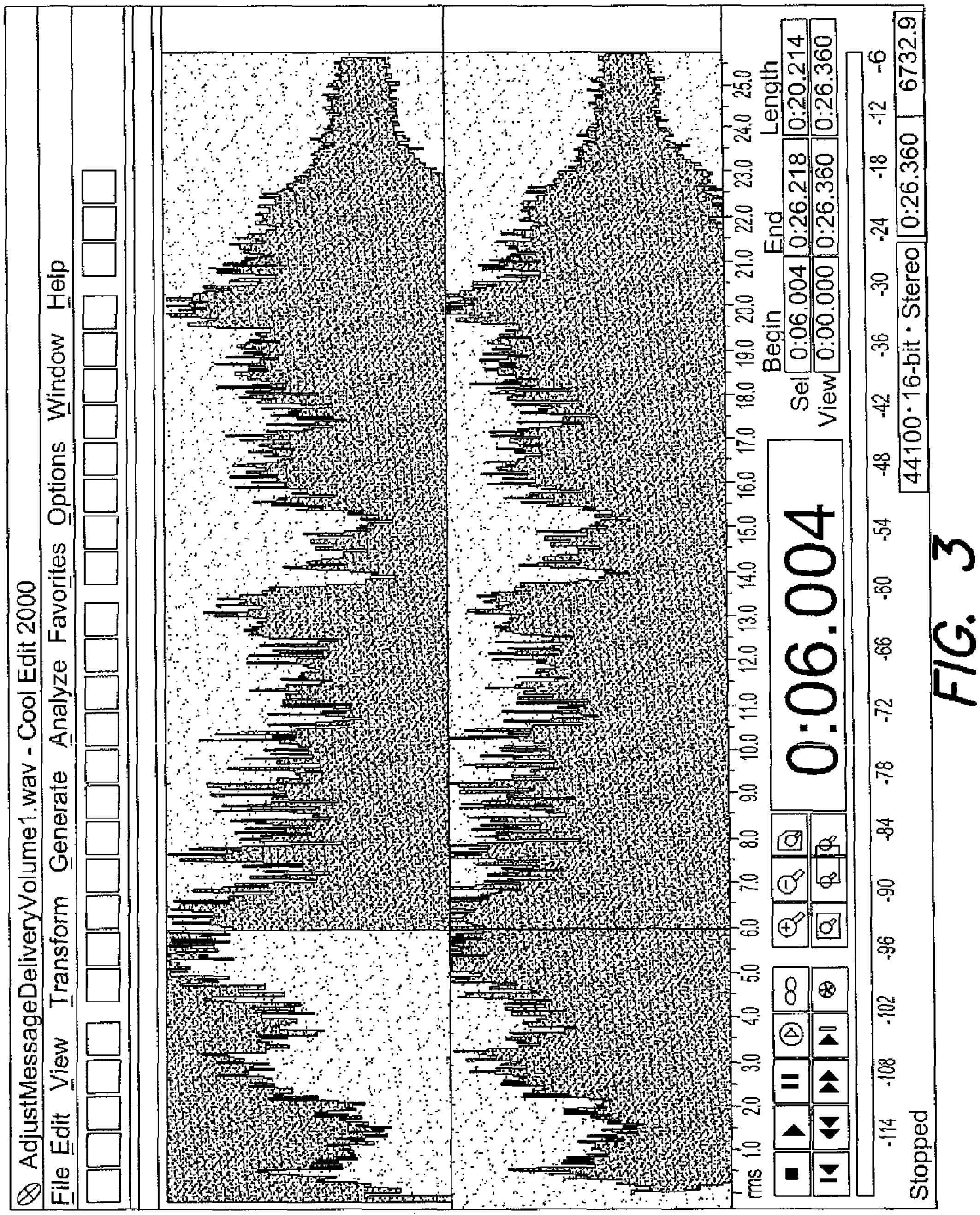
FIG. 3 is a diagram showing a defined history of noise selected and analyzed in an example of noise recorded in a car being surrounded by loud noise.
Figure 4:
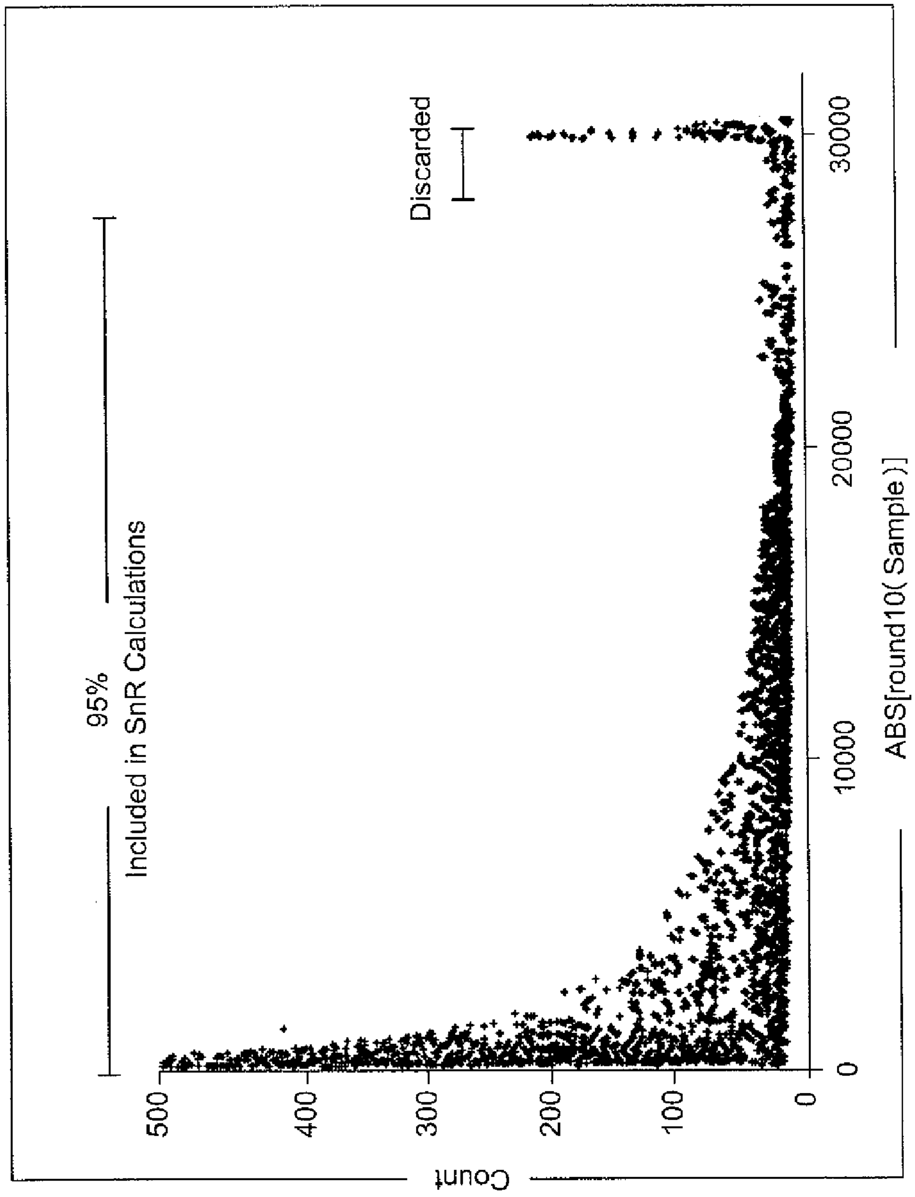
FIG. 4 is a plot showing that non-constant features of audio are discarded.

FIG. 3 shows, as an example, a defined history of noise selected and analyzed in an extreme example of noise recorded in a car being surrounded by loud noise. The noise levels in the car will be monitored and computed in a time interval of about 10-30 seconds, preferably 20 seconds. When a message is to be delivered, the defined window of background data could be analyzed by known methods. First, the last 20 seconds of data would be considered. In one embodiment, all the data would be analyzed for $RMS_{noise}$. In an alternate embodiment, the data would eliminate the extremes to discard singular spikes (such as the door slamming as a passenger gets in). This could be accomplished by discarding the most extreme 5% of the data (see FIG. 4). In either case, known methods would be applied to compute $RMS_{noise}$.

Equation (1) would subsequently be solved for $A_{signal}$ and an amplification of the delivered message would occur through known methods in order to achieve the $SNR_{min}$. At the time of delivery, record the delivery of the message to compute $SNR_{actual}$. If this value falls below $SNR_{min}$ then the message is repeated (if necessary, indicating it is a repetition by prefixing the message with a keyword such as "Again . . . "). Microphone placement should be at or near the location of the intended recipient.

Figure 5:
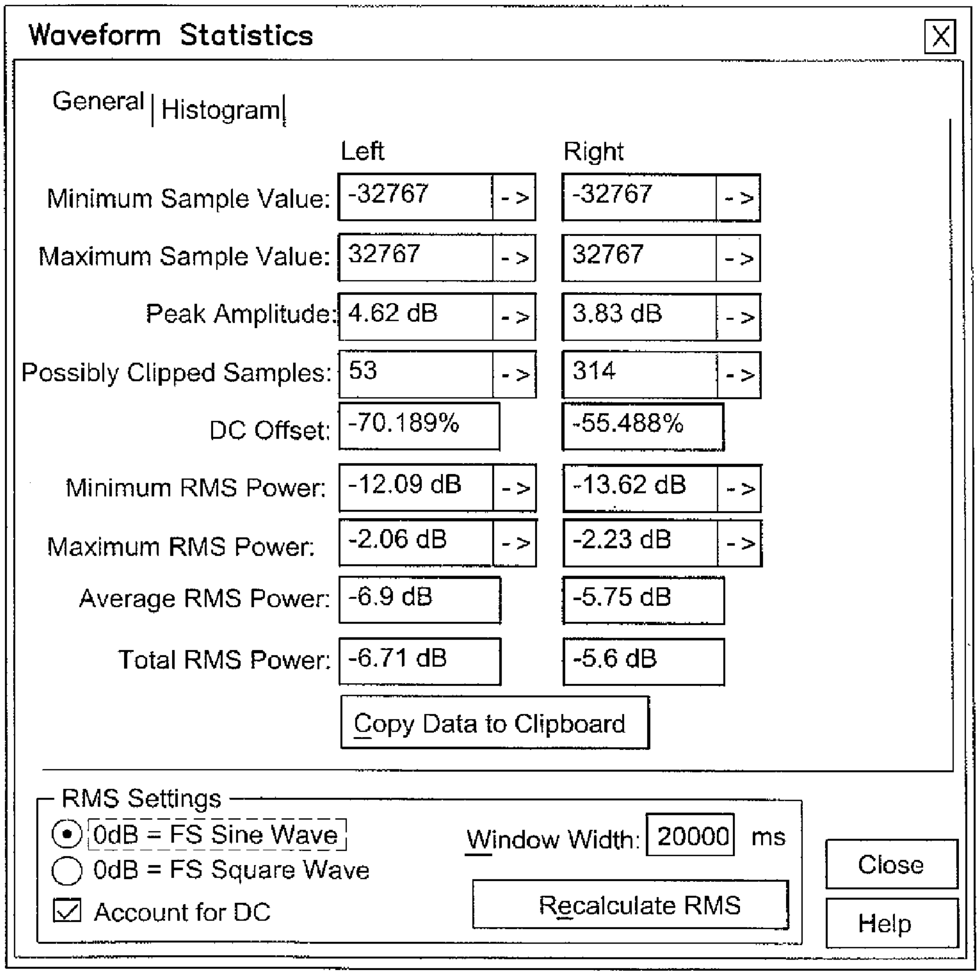
FIG. 5 is a chart showing a statistical analysis of environmental noise.

FIG. 5 shows a statistical analysis of environmental noise. An average power $P_{noise}$ or RMS amplitude $A_{noise}$ of the noise can be obtained from this analysis.

Figure 6:
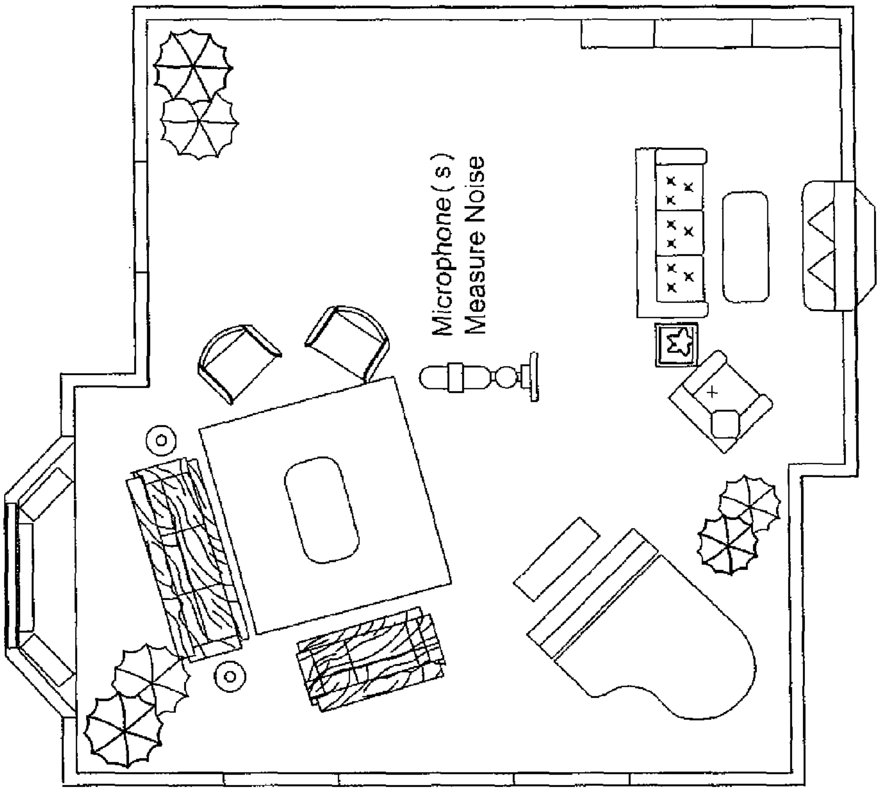
FIG. 6 is a schematic diagram of a floor plan of a living room as another example of voice environment.

FIG. 6 depicts a floor plan of a living room, another type of voice environment. Possible sources of noise which could be controlled by the system are the fan, radio, and television. Possible sources outside control of the system are the piano, people in the room, or a vacuum cleaner being operated within the room. Speaker placement may be variable so the microphone at or near the center of the room could be used to calculate both $SNR_{desired}$ and $SNR_{actual}$.

Figure 7:
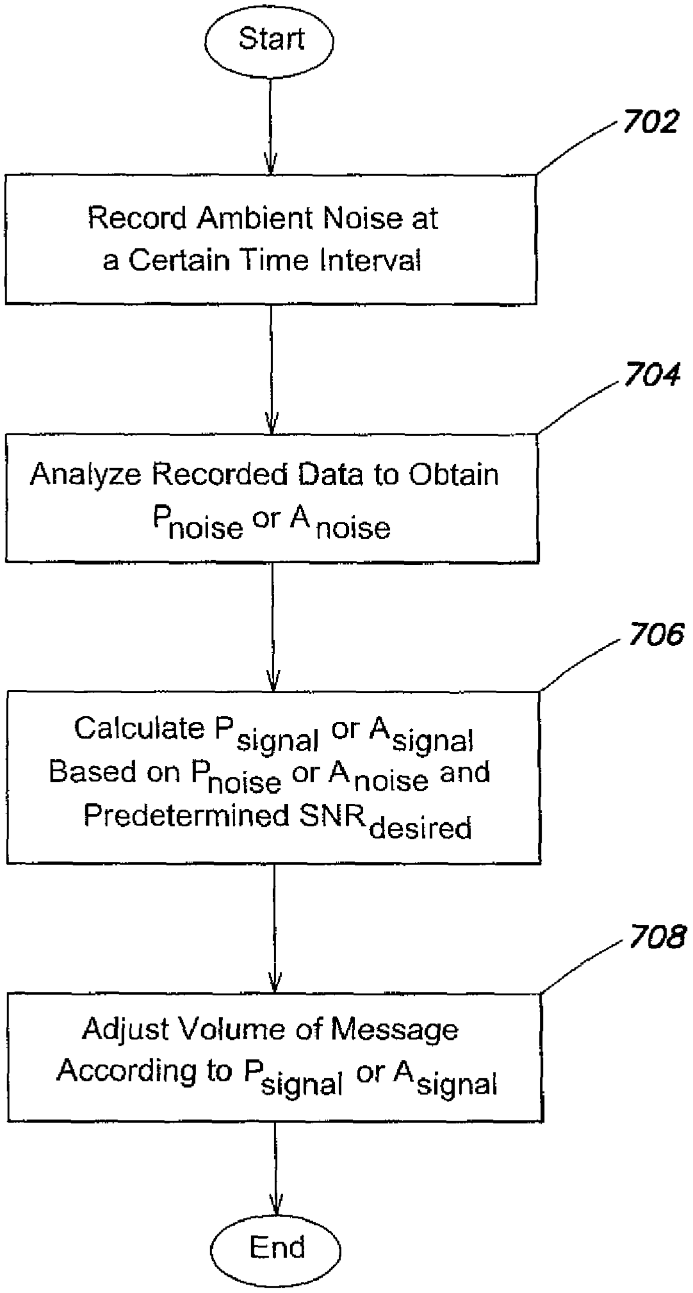
FIG. 7 is a flow chart of exemplary steps for delivering a message to a recipient in an environment with ambient noise, according to one embodiment of the present invention.

FIG. 7 is a flow chart of exemplary steps for delivering a message to a recipient in an environment with ambient noise, according to one embodiment of the present invention. As shown in FIG. 7, first, at step 702, the ambient noise in the environment is recorded at a certain time interval. The recorded ambient noise is then analyzed, at step 704, to obtain an average power $P_{noise}$ or RMS amplitude $A_{noise}$ of the ambient noise. Subsequently, at step 706, an average signal power $P_{signal}$ or RMS amplitude $A_{signal}$ of the message to be delivered is calculated based on the $P_{noise}$ or $A_{noise}$ and a predetermined desired $SNR_{desired}$. Finally, at step 708, a volume of the message to be delivered is adjusted according to the $P_{signal}$ or $A_{signal}$.

Figure 8:
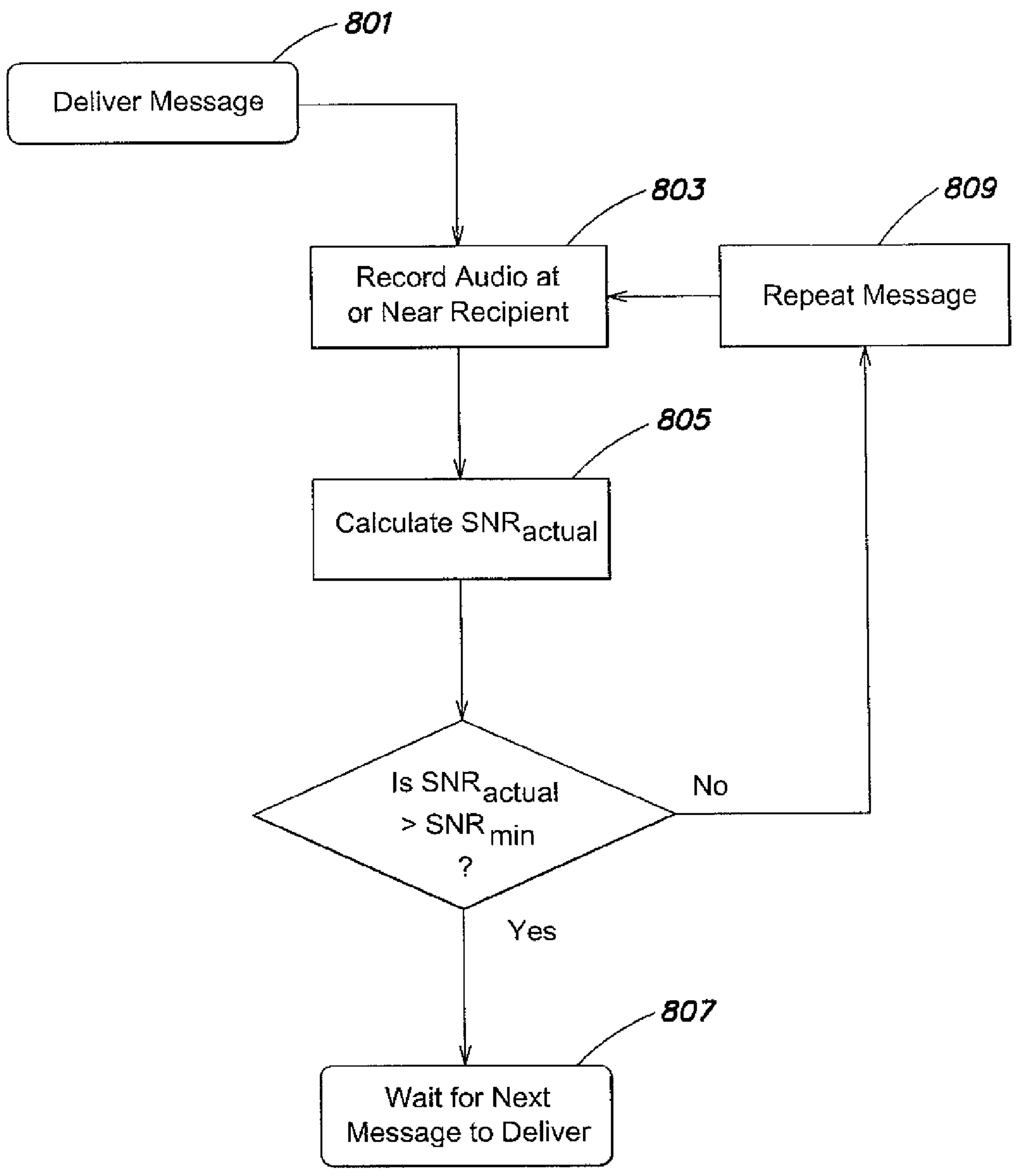
FIG. 8 is a flow chart of exemplary steps for delivering a message to a recipient in an environment with ambient noise, according to another embodiment of the present invention.

FIG. 8 is a flow chart of exemplary steps for delivering a message to a recipient in an environment with ambient noise according to another embodiment of the present invention. More specifically, FIG. 8 shows the process of determining if message needs to be redelivered. FIG. 8 illustrates the possible iterative nature of determining if a message has been properly delivered to the recipient. Due to the dynamic nature of a speech system's environment, it may be desirable to say the message a few times until it is certain that it is delivered.

As shown in FIG. 8, first, at step 801, a voice message is delivered. Then, at step 803, the audio at or near the recipient is recorded and, at step 805, the $SNR_{actual}$ calculated. If the $SNR_{actual}$ is greater than the $SNR_{min}$, the system, at step 807, will wait to deliver the next message. If, however, the $SNR_{actual}$ is smaller than the $SNR_{min}$, the system will, at step 809, repeat the message, preferably with a keyword before it.

In another embodiment of the method, the system can calculate the SNR and adjust the volume of TTS in real-time based on a sliding window of the last x seconds of audio. The benefit of this approach is that the message would not have to be repeated, but would require more calculations.

By using the systems and methods of the present invention, the message will be delivered to the user with certainty and with adequate SI without any discomfort of the user. Further advantages of the invention can be seen from the above description and the associated drawings.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention has been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method for delivering a message to a recipient in an environment with ambient noise, the method comprising:

recording the ambient noise in the environment at a certain time interval;

analyzing the recorded ambient noise to obtain an average power $P_{noise}$ or RMS amplitude $A_{noise}$ of the ambient noise;

providing a predetermined desired Signal-to-Noise Ratio $SNR_{desired}$;

calculating an average signal power $P_{signal}$ or RMS amplitude $A_{signal}$ of the message to be delivered based on the $P_{noise}$ or $A_{noise}$ and the desired $SNR_{desired}$; and adjusting a volume of the message to be delivered according to the $P_{signal}$ or $A_{signal}$.

2. The method according to claim 1, wherein the time interval is approximately between 10-30 seconds.

3. The method according to claim 2, wherein the time interval is 20 seconds.

4. The method according to claim 1, wherein all the recorded data of the ambient noise is analyzed.

5. The method according to claim 1, wherein extremes in the recorded data of the ambient noise are discarded.

6. The method according to claim 5, wherein the extremes are singular spikes.

7. The method according to claim 5, wherein approximately 5% of the extremes are discarded.

8. The method according to claim 1, wherein a microphone is provided for recording the ambient noise.

9. A method for delivering a message to a recipient in an environment with ambient noise, the method comprising:

delivering the message;

recording audio at or near the recipient;

analyzing the recorded audio to obtain an actual Signal-to-Noise Ratio $SNR_{actual}$;

providing a predetermined minimum Signal-to-Noise Ratio $SNR_{min}$; and repeating the message if the actual $SNR_{actual}$ falls below the $SNR_{min}$, otherwise waiting to deliver a next message.

10. The method according to claim 9, wherein a microphone is provided for recording the audio.

11. The method according to claim 9, further comprising indicating the repeated message by prefixing the message with a keyword.

12. A system for delivering a message to a recipient in an environment with ambient noise, the system comprising:

a recording unit for recording the ambient noise in the environment at a certain time interval;

an analyzing unit for analyzing the recorded ambient noise to obtain an average power $P_{noise}$ or RMS amplitude $A_{noise}$ of the ambient noise;

means for providing a predetermined desired Signal-to-Noise Ratio $SNR_{desired}$;

a calculating unit for calculating an average signal power $P_{signal}$ or RMS amplitude $A_{signal}$ of the message to be delivered based on the $P_{noise}$ or $A_{noise}$ and the desired $SNR_{desired}$; and an adjusting unit for adjusting a volume of the message to be delivered according to the $P_{signal}$ or $A_{signal}$.

13. The system according to claim 12, wherein the recording unit is a microphone.

14. The system according to claim 12, wherein the system is integrated with a voice system.

15. The system according to claim 12, wherein the system is external to a voice system.

16. A system for delivering a message to a recipient in an environment with ambient noise, the system comprising:

a delivering unit for delivering the message;

a recording unit for recording audio at or near the recipient when the message is delivered;

an analyzing unit for analyzing the recorded audio to obtain an actual $SNR_{actual}$;

means for providing a predetermined minimum Signal-to-Noise Ratio $SNR_{min}$;

a comparing unit for comparing the actual $SNR_{actual}$ with the $SNR_{min}$; and means for repeating the message if the actual $SNR_{actual}$ falls below the $SNR_{min}$.

17. The system according to claim 16, wherein the recording unit is a microphone.

18. The system according to claim 16, wherein the system is integrated with a voice system.

19. The system according to claim 16, wherein the system is external to a voice system.

20. The system according to claim 16, wherein the message is repeated with a prefixed keyword.

21. The system according to claim 16, wherein the means for repeating the message is the delivering unit.

22. The system according to claim 16, wherein the means for repeating the message is a different unit at a different location from the delivering unit.

* * * * *